US011557771B2

(12) United States Patent
Stahl et al.

(10) Patent No.: US 11,557,771 B2
(45) Date of Patent: Jan. 17, 2023

(54) ELECTROCHEMICALLY ACTIVE UNIT FOR AN ELECTROCHEMICAL DEVICE

(71) Applicant: ElringKlinger AG, Dettingen (DE)

(72) Inventors: Peter Stahl, Metzingen (DE); Juergen Kraft, Metzingen (DE); Karsten Dahl, Owen (DE); Oliver Fink, Ehingen (DE); Alexander Groeh, Tuebingen (DE)

(73) Assignee: EKPO Fuel Cell Technologies GmbH, Dettingen (DE)

( * ) Notice: Subject to any disclaimer, the term of this patent is extended or adjusted under 35 U.S.C. 154(b) by 159 days.

(21) Appl. No.: 16/750,569

(22) Filed: Jan. 23, 2020

(65) Prior Publication Data

US 2020/0161673 A1 May 21, 2020

Related U.S. Application Data

(63) Continuation of application No. PCT/EP2018/069107, filed on Jul. 13, 2018.

(51) Int. Cl.
| | |
|---|---|
| *H01M 8/0273* | (2016.01) |
| *H01M 4/88* | (2006.01) |
| *H01M 8/1004* | (2016.01) |
| *H01M 8/10* | (2016.01) |
| *C25B 9/19* | (2021.01) |

(52) U.S. Cl.
CPC ............. *H01M 8/0273* (2013.01); *C25B 9/19* (2021.01); *H01M 4/8807* (2013.01); *H01M 8/1004* (2013.01); *H01M 2008/1095* (2013.01)

(58) Field of Classification Search
CPC ................................................... H01M 8/0273
See application file for complete search history.

(56) References Cited

U.S. PATENT DOCUMENTS

| | | | |
|---|---|---|---|
| 2005/0271926 A1 | 12/2005 | Sugita et al. | |
| 2007/0003821 A1* | 1/2007 | Belchuk .............. | H01M 8/0286 |
| | | | 429/465 |
| 2007/0202381 A1 | 8/2007 | Diaz | |
| 2008/0309027 A1 | 12/2008 | Rogeon et al. | |
| 2009/0233131 A1 | 9/2009 | Morimoto et al. | |

(Continued)

FOREIGN PATENT DOCUMENTS

| | | |
|---|---|---|
| DE | 10 2012 023 472 | 6/2014 |
| EP | 1 403 949 | 3/2004 |

*Primary Examiner* — Brian R Ohara (74) *Attorney, Agent, or Firm* — Womble Bond Dickinson (US) LLP (57) ABSTRACT

In order to provide an electrochemically active unit for an electrochemical device including a membrane electrode assembly, at least one gas diffusion layer and a seal that is linked to at least one of the at least one gas diffusion layers, in the manufacture whereof as even as possible a construction of the penetration region in which the gas diffusion layer of the electrochemically active unit is penetrated by the sealing material of the seal over the periphery of the gas diffusion layer is achievable, the seal includes a linking region, a distribution region and a connection region that connects the linking region and the distribution region to one another, wherein the connection region has a minimum height that is less than a quarter of the maximum height of the distribution region and less than a quarter of the maximum height of the linking region.

10 Claims, 4 Drawing Sheets

(56) References Cited

U.S. PATENT DOCUMENTS

| | | |
|---|---|---|
| 2012/0122010 A1 | 5/2012 | Okabe |
| 2013/0071772 A1 | 3/2013 | Belchuk |
| 2014/0065509 A1 | 3/2014 | Skala |
| 2015/0079491 A1 | 3/2015 | Ishida et al. |
| 2017/0012301 A1 | 1/2017 | Kraft et al. |

* cited by examiner

ELECTROCHEMICALLY ACTIVE UNIT FOR AN ELECTROCHEMICAL DEVICE

CROSS-REFERENCE TO RELATED APPLICATIONS

This application is a continuation application of PCT/EP2018/069107 filed on Jul. 13, 2018, which claims priority to DE 10 2017 117 146.0 filed on Jul. 28, 2017, which are each incorporated herein by reference in their entireties.

FIELD OF DISCLOSURE

The present invention relates to an electrochemically active unit for an electrochemical device, wherein the electrochemically active unit includes a membrane electrode assembly, at least one gas diffusion layer and a seal that is linked to at least one of the at least one gas diffusion layers.

An electrochemically active unit of this kind may, together with a respective bipolar plate, form an electrochemical cell of the electrochemical device, which takes the form for example of a fuel cell stack or an electrolyzer.

The electrochemical device preferably includes a plurality of electrochemical cells, which are arranged one above the other in a stack direction, and preferably two end plates, between which the stack of electrochemical cells is arranged and which are clampable against one another by means of a clamping device in order to apply a clamping force along the stack direction to the electrochemical cells arranged between them and in particular to their electrochemically active units.

BACKGROUND

In fuel cell stacks and electrolyzers, different media are guided in different levels of an electrochemical cell and, depending on the design, also in different regions of the same level. These media may be in particular an anodic fluid (fuel gas), a cathodic fluid (oxidation agent), and where appropriate also a fluid coolant.

The media to be supplied to the electrochemical device (cathodic fluid, anodic fluid, coolant) are supplied to the different levels of the electrochemical device, or removed from the different levels of the electrochemical device, by a media distribution structure (also called a manifold) having medium supply ducts and medium removal ducts that extend in the stack direction of the electrochemical device, and these media must in each case be supplied from a medium supply duct to the flow field of the respective medium in an electrochemical cell, and removed from the flow field again through a medium removal duct. Here, both the medium supply ducts and medium removal ducts and also the flow fields must be sealed in order to prevent leaks both into the external space around the electrochemical device and also between the spaces through which the different media flow.

The media guided through the electrochemical device must not mix with one another nor escape from the electrochemical cells, so seals are required on a plurality of levels.

These seals may for example be based on elastomer materials and/or adhesives.

In electrochemical cells having metal bipolar plates, the seals may take the form, entirely or partly, of beads in the bipolar plate, or of seals based on elastomer materials.

The bipolar plates (also called separators or interconnectors) may be made in one piece or include at least two individual layers (bipolar plate layers).

The bipolar plate layers of a multiple-layer bipolar plate may be connected to one another by joining methods such as welding or adhesion.

A seal may be inserted into the stack of electrochemical cells as a separate component or be fixed to a bipolar plate or to another constituent part of an electrochemical cell, for example a gas diffusion layer or a membrane electrode assembly.

Because of the advantages for handling and manufacture, and because of the simple seal construction, fixing the seal to a bipolar plate is frequently preferred. This may be done by injection molding a seal, in particular made from an elastomer material, onto a layer of the bipolar plate.

In this seal configuration, it has proved advantageous to combine the seal that is fixed to the bipolar plate with an edge reinforcement arrangement that is fixed to the membrane electrode assembly (in particular a catalyst coated membrane, CCM) in the edge region of the membrane electrode assembly, in which case the edge reinforcement arrangement serves as a mating component for the seal, helps to prevent a disadvantageous mechanical load on the membrane electrode assembly, and at the same time ensures an advantageous linking between the electrochemically active region of the membrane electrode assembly and the edge region of the membrane electrode assembly.

An edge reinforcement arrangement of this kind is disclosed for example in EP 1 403 949 B1.

An edge reinforcement arrangement of this kind is also called a sub-gasket.

An edge reinforcement arrangement of this kind may include one or more layers, wherein a typical structure includes two layers that are arranged on two mutually opposite sides of the membrane electrode assembly in the form of a peripheral frame.

The manufacture and installation of an edge reinforcement arrangement are complex and costly, however. Moreover, additional installation space is required for the overlap between the edge reinforcement arrangement and the membrane electrode assembly, as a result of which the volumetric energy density of the electrochemical device is reduced.

It is possible to dispense with an edge reinforcement arrangement if the seal is linked directly to a gas diffusion layer, since this results in the seal and the gas diffusion layer merging smoothly into one another.

A membrane electrode assembly that is compressed between two seal/gas diffusion layer units does not undergo excessive spikes in the clamping force.

By comparison with a sealing solution with an edge reinforcement arrangement, a cell structure with seal/gas diffusion layer units may be of very compact construction, since no additional space has to be provided for the overlap between the edge reinforcement arrangement and the membrane electrode assembly.

It is possible to link a seal to a gas diffusion layer for example in an injection molding process. In this case, a gas diffusion layer is inserted into a (preferably multiple-part) injection mold and overmolded with a sealing material around its outer periphery.

Where the gas diffusion layer merges with the sealing material, a penetration region is produced, in which the sealing material penetrates part of the porous gas diffusion layer.

This penetration region creates a substance-to-substance bond or a positive engagement between the gas diffusion layer and the seal, such that the gas diffusion layer and the seal have a sufficient mechanical connection with one another during the subsequent assembly steps and during operation of the electrochemical device.

In the penetration region, the pores of the gas diffusion layer are filled with sealing material, with the result that transport of a cathodic fluid or anodic fluid to the active region of the electrochemically active unit is made more difficult in this region. The penetration region should for this reason include as small a proportion of the gas diffusion layer as possible and yet be sufficiently large to ensure a stable mechanical linking between the gas diffusion layer and the seal.

In order to delimit the penetration region on the gas diffusion layer side, the gas diffusion layer, which is mechanically compressible in the direction of its thickness (parallel to the stack direction of the electrochemical device), is compressed locally in the injection mold by a compression edge. This raises the capillary pressure in the pores of the gas diffusion layer locally, and limits the penetration of the gas diffusion layer by the sealing material in the x and y directions perpendicular to the direction of thickness (z direction).

The compression edge must compress the gas diffusion layer by a minimum pressure in order to limit the penetration of the gas diffusion layer by the sealing material. However, the local compression of the gas diffusion layer by the compression edge must not be too great either, since the gas diffusion layer can be damaged in the event of excessive compression, for example by fibers breaking.

The extent to which the sealing material penetrates the gas diffusion layer depends on the locally prevailing pressure of the sealing composition in the injection mold, in the respective region of the gas diffusion layer. Moreover, the degree of penetration of the gas diffusion layer by the sealing material depends on the viscosity of the sealing material, the temperature of the injection mold (which affects, among other things, the viscosity of the sealing material) and the properties of the gas diffusion layer in the region of the compression edge and the rest of the region of the gas diffusion layer, in particular the porosity, the tortuosity (that is to say the amount by which the transport paths within the gas diffusion layer twist), the capillary pressure and the hydrophobicity.

When a seal is linked to a gas diffusion layer in an injection molding process or similar method, sealing material is introduced into the cavity of the injection mold at an injection point or a plurality of injection points and then spreads out along flow paths, forming a flow front in the cavity.

During the injection process, a pressure gradient is formed along the flow path. The highest pressure in the cavity can be expected at the injection point; the pressure falls with increasing distance from the injection point.

Since, in the case of a seal that is linked to a gas diffusion layer, the seal extends around the gas diffusion layer with a relatively small seal cross section (for example in the range of from 5 mm² to 30 mm²) and the gas diffusion layer may have relatively long lateral lengths (for example lateral lengths in the range of from 70 mm to 400 mm), then, depending on the positioning and number of the injection points, flow paths are produced which, during the injection molding process, result in a major drop in pressure over the length of the flow path. The internal mold pressure occurring in the penetration region of the gas diffusion layer thus results in dependence on the position relative to the injection point. In sections of the penetration region close to an injection point, a higher internal mold pressure during the injection molding process can be expected than in sections further away from the injection point.

In the case of known seals that are injection molded onto a gas diffusion layer, it is thus possible for an excessive penetration of the gas diffusion layer by sealing material to occur in sections of the penetration region close to injection points, as a result of which the porosity of the gas diffusion layer is drastically reduced locally, and functioning of the electrochemical device is impaired.

In order to reduce the penetration of the gas diffusion layer by sealing material, it may thus be necessary to provide a larger number of injection points in the mold, and/or to shift the process parameters into a range that is disadvantageous for rapid performance of the injection molding method (for example by using a lower mold temperature, a lower injection rate and/or lower internal mold pressures). All these measures result in higher mold and/or process costs.

SUMMARY OF THE INVENTION

The object of the present invention is to provide an electrochemically active unit for an electrochemical device of the type mentioned above, in the manufacture whereof as even as possible a construction of the penetration region in which the gas diffusion layer of the electrochemically active unit is penetrated by the sealing material of the seal over the periphery of the gas diffusion layer is achievable.

This object is achieved according to the invention with an electrochemically active unit having the features of the precharacterizing clause of claim 1, in that the seal includes a linking region, a distribution region (or runner region) and a connection region that connects the linking region and the distribution region to one another, wherein the connection region has a minimum height $h_C$ that is less than a quarter of the maximum height $H_V$ of the distribution region and less than a quarter of the maximum height $H_A$ of the linking region.

The concept underlying the present invention is that the connection region between the distribution region and the linking region should be constructed as a constriction point that has a high flow resistance, in particular when the seal is manufactured by an injection molding method.

The result is that, of the total flow resistance between the injection point and the linking region of the seal linked to the gas diffusion layer, only a small proportion is attributable to the distribution region of the seal. As a result, at the start of the injection molding process a preferred filling of the distribution region is achieved, before filling of the linking region linked to the gas diffusion layer.

This results further in the fact that the smallest possible internal pressure of the injected sealing material, in particular an elastomer material, in the cavity of the injection mold occurs in the region of the seal directly adjoining the porous gas diffusion layer.

The structure of the seal, which in the injection mold corresponds to the flow paths of the injected sealing material, is preferably such that all the flow resistances and hence the pressure losses between an injection point and different points in the linking region of the seal adjoining the gas diffusion layer lie in as narrow a range of values as possible.

The distribution region of the seal has a large flow cross section, so during the injection molding process the distribution region serves as a sub-distributor in the mold cavity.

The sections of the distribution region that have a large flow cross section may remain on the finished seal or be removed by post-treatment.

If these sections remain on the seal, they may include functional elements of the seal, such as one or more sealing lips and/or one or more deformation limiters.

During manufacture of the seal according to the invention, the flow resistances between the point at which the sealing material is injected and the different sections of the linking region of the seal, in which the seal is linked to the gas diffusion layer, lie in a narrow range of values, as a result of which even and/or simultaneous mold filling of the linking region during the injection molding process is achieved.

For this reason, the parameters of the manufacturing process can be selected such that the internal pressure in the cavity is significantly lower in the linking region of the seal. As a result, the compression edges, which are intended to prevent excessive penetration of the gas diffusion layer by sealing material, may be constructed such that the gas diffusion layer is compressed to a less pronounced extent. This makes it possible to carry out the injection molding process without any problems even if the thickness of the gas diffusion layer and the dimensions of the injection molds vary over a broad tolerance range.

Moreover, the reliability of the process is enhanced in that mechanical damage to the gas diffusion layer as a result of excessive compression is avoided.

When a seal linked to a gas diffusion layer is manufactured in an injection mold, the sealing material undergoes shrinkage as a result of the curing process, and in addition the sealing material undergoes thermal expansion, which may differ from the thermal expansion of the gas diffusion layer. As a result, stresses between the components may arise, and these may lead to distortion.

Preferably, the thin connection region between the distribution region and the linking region of the seal is deformable with flexibility, as a result of which some of this distortion and/or shrinkage by the sealing material can be compensated and so distortion of the components can be reduced.

The electrochemically active unit according to the invention may in particular be used in a fuel cell device, in particular in a PEM (polymer electrolyte membrane) fuel cell device, or in an electrolyzer.

The seal may be linked to only one gas diffusion layer of the electrochemically active unit or to two gas diffusion layers of the electrochemically active unit, in particular to a gas diffusion layer on the cathode side and to a gas diffusion layer on the anode side of the electrochemically active unit.

Further, the seal may also be linked to the membrane electrode assembly of the electrochemically active unit and/or to a bipolar plate.

The seal of the electrochemically active unit according to the invention is preferably manufactured in an injection mold by an injection molding method.

Here, the gas diffusion layer, which has a porous structure, is penetrated to a partial extent by sealing material.

Further, the seal may also be linked to an end plate of an electrochemical device, in particular of a fuel cell stack or an electrolyzer.

The seal substantially surrounds the outer edges of the gas diffusion layer to which the seal is linked.

The linking region is in direct contact with the gas diffusion layer.

The distribution region of the seal is provided outside the linking region and can surround the linking region entirely or only in certain regions.

The distribution region and the linking region are connected to one another by the connection region.

The distribution region preferably has a large cross section of throughflow, as seen perpendicular to a longitudinal direction of the distribution region.

The cross section of the distribution region is preferably at least 1 mm².

Further, it may be provided for the cross section of the distribution region to be at most 20 mm².

The maximum height $H_V$ of the distribution region is preferably at least 0.5 mm.

The maximum height $H_V$ of the distribution region is preferably at most 2 mm.

The connection region has significantly less thickness or height than the distribution region.

In this description and the attached claims, the term "height" for a region of the seal is used to mean the extent of the relevant region of the seal parallel to the stack direction of the electrochemical device in which the electrochemically active unit is used.

The connection region may take the form of a thin film.

The minimum height $h_C$ of the connection region is preferably less than a sixth, in particular less than an eighth, of the maximum height $H_V$ of the distribution region and/or preferably less than a sixth, in particular less than an eighth, of the maximum height $H_A$ of the linking region.

The minimum height $h_C$ of the connection region is preferably less than 0.3 mm, in particular less than 0.1 mm, particularly preferably less than 0.05 mm.

The thickness of the connection region may vary over the periphery of the gas diffusion layer.

The electrochemically active unit according to the invention includes a seal that is linked directly to one or more porous layers of the electrochemically active unit, preferably by an injection molding method, wherein preferably a film gate that is integrated into the seal is provided. This film gate may be utilized to reduce significantly the maximum internal pressure in the cavity of the injection mold directly at the porous layer, in order in this way to reduce significantly the penetration of the porous layer by the sealing material.

In a preferred embodiment of the invention, it is provided for the minimum height $h_C$ of the connection region to be less than 0.3 mm, in particular less than 0.1 mm, particularly preferably less than 0.05 mm.

The connection region may for example be of a constant height of for example 0.1 mm.

The connection region takes the form, preferably at least in certain regions, in particular substantially entirely, of a flexible film.

The connection region may have thickened portions in which the connection region has a height $H_D$ that is greater than the minimum height $h_C$ of the connection region, and which are spaced from one another in a longitudinal direction of the connection region.

Here, it may in particular be provided for at least one of the thickened portions to extend over the entire width of the connection region in a transverse direction of the connection region, perpendicular to the longitudinal direction of the connection region.

Further, it may be provided for the height $H_D$ of the thickened portions, the extent $L_D$ of each thickened portion in the longitudinal direction of the connection region, and/or the spacing $A_D$ between each pair of thickened portions succeeding one another in the longitudinal direction of the connection region to vary in the longitudinal direction of the connection region.

The seal may have a sealing lip or a plurality of sealing lips, for example two sealing lips, that form a constituent part of the distribution region or a constituent part of the linking region.

Further, the seal may have at least one deformation limiter that forms a constituent part of the distribution region or a constituent part of the linking region.

A deformation limiter of this kind (also called a hard stop) serves to limit the compression of other elements of the seal, for example a sealing lip, when the electrochemically active unit is acted upon by a clamping force.

The deformation limiter may in particular serve as a stop that prevents further deformation of the seal when it is acted upon by a clamping force.

In a preferred embodiment of the invention, it is provided for the maximum height $H_V$ of the distribution region to be at least 1.2 mm.

The cross section of the distribution region—taken perpendicular to the longitudinal direction of the distribution region—may remain substantially constant in the longitudinal direction of the distribution region or vary in the longitudinal direction of the distribution region.

In particular, it may be provided for the size of the cross section of the distribution region to vary in dependence on the spacing from a point at which the sealing material is injected. For example, it may be provided for the size of the cross section of the distribution region to increase as the spacing from an injection point increases.

In a preferred embodiment of the invention, it is provided for the seal to be injection molded and for the material of the seal to penetrate part of at least one gas diffusion layer of the electrochemically active unit.

The electrochemically active unit according to the invention may include two seals, each linked to at least one gas diffusion layer.

The electrochemically active unit according to the invention is suitable in particular for use in an electrochemical device, for example in a fuel cell stack or an electrolyzer.

In the assembled condition of the electrochemical device, the seal of the electrochemically active unit may abut in fluid-tight and sealing manner against another seal and/or against a bipolar plate.

The basic construction and the manufacture of an electrochemical device of this kind are described in DE 10 2015 109 393 A1, to which reference is made here and whereof the content is incorporated into this application.

The material of the seal is preferably an elastomer material.

Further features and advantages of the invention form the subject matter of the description below and the illustrative drawing of exemplary embodiments.

BRIEF DESCRIPTION OF THE DRAWINGS

Like or functionally equivalent elements are designated by the same reference numerals in all Figures.

DETAILED DESCRIPTION OF THE INVENTION

Figure 1:
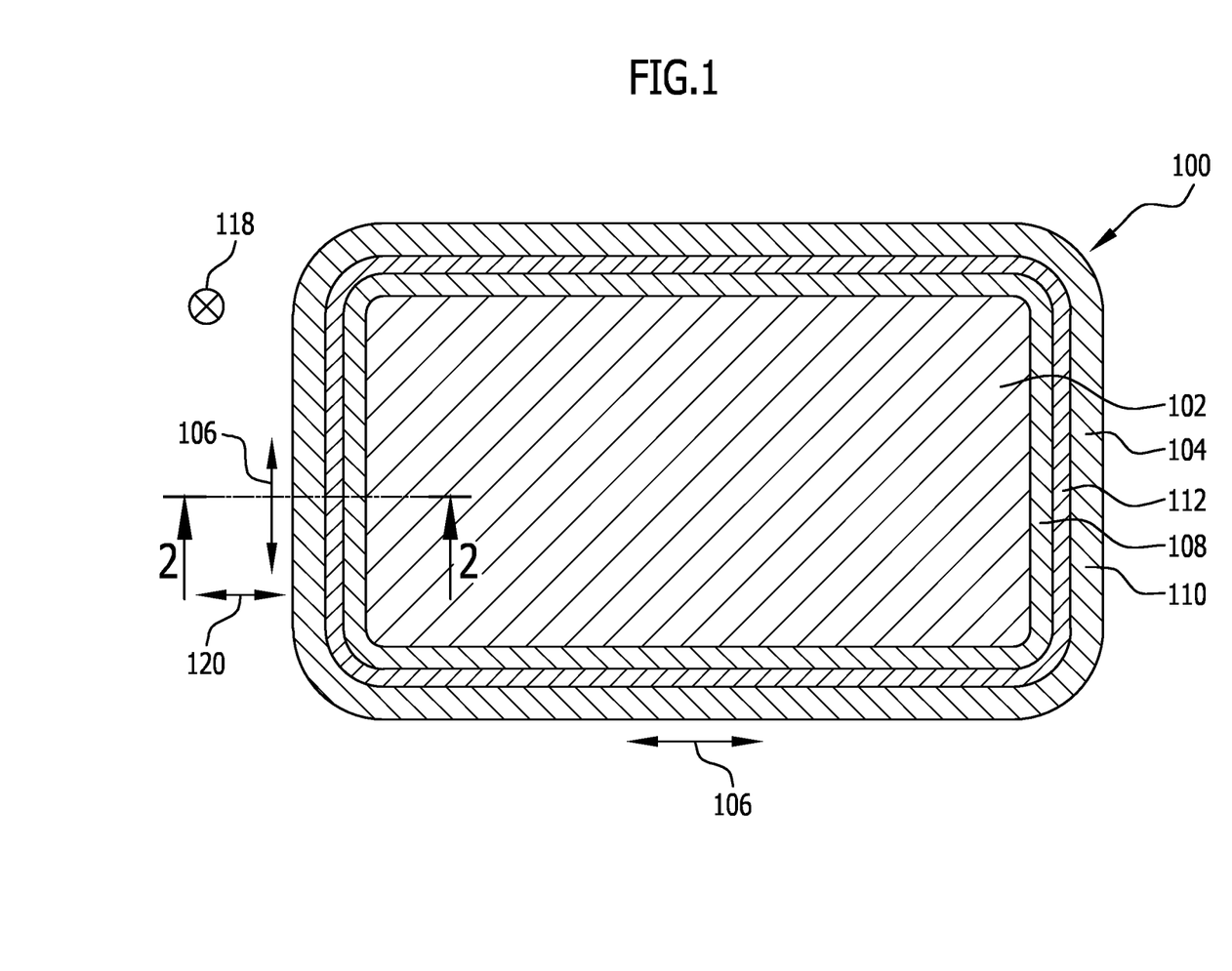
FIG. 1 shows a schematic plan view of an electrochemically active unit for an electrochemical device, which includes a membrane electrode assembly (not illustrated), at least one gas diffusion layer and a seal that is linked to at least one of the at least one gas diffusion layers.
Figure 2:
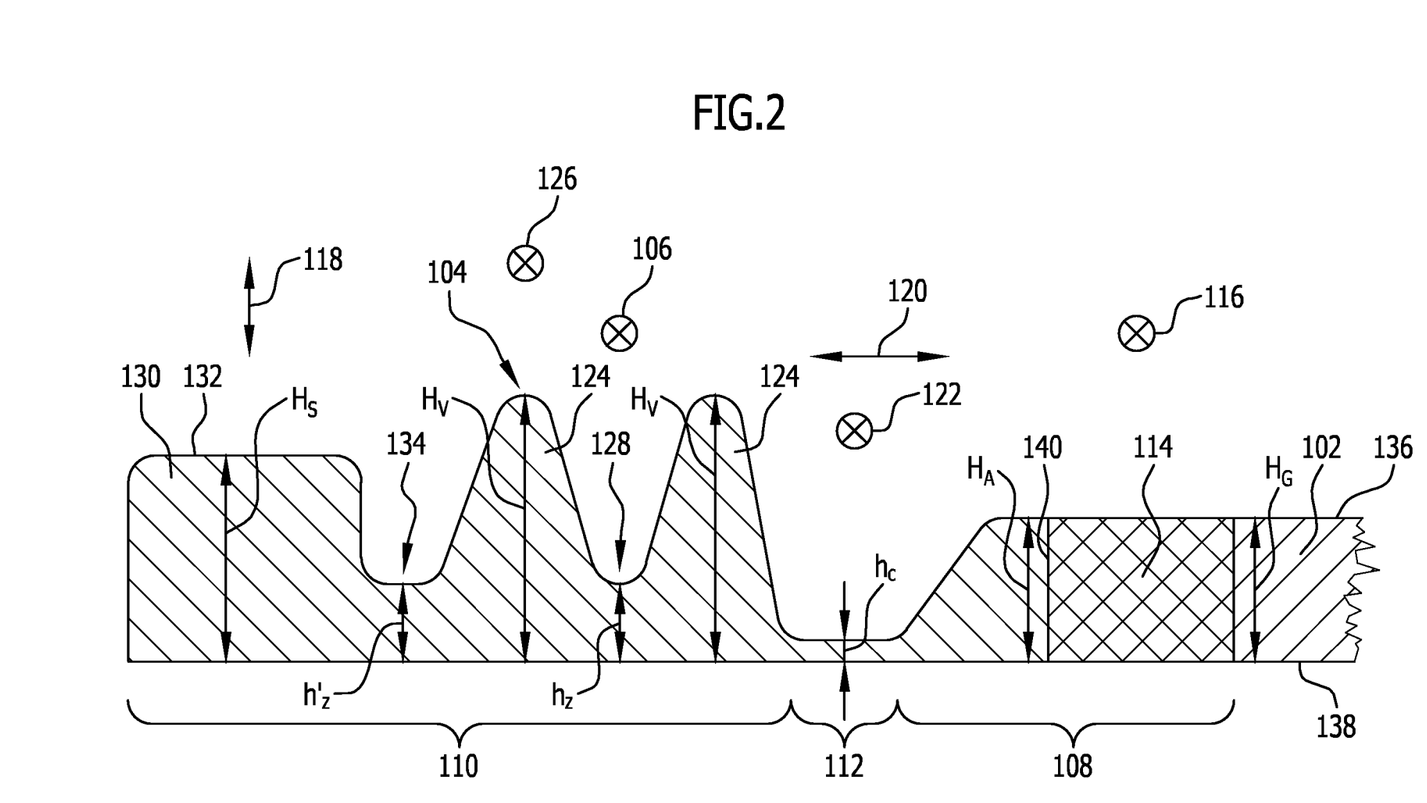
FIG. 2 shows a cross section of a detail, through the seal and the gas diffusion layer from FIG. 1, along the line 2-2 in FIG. 1, wherein it can be seen from the cross section that the seal includes: a linking region that penetrates part of the at least one gas diffusion layer of the electrochemically active unit; a distribution region that includes one or more sealing lips and/or a deformation limiter for the seal; and a connection region that connects the distribution region and the linking region to one another.

An electrochemically active unit that is illustrated in FIGS. 1 and 2 and is designated 100 as a whole, for an electrochemical device (not illustrated as a whole), for example for a fuel cell stack or an electrolyzer, includes a membrane electrode assembly (not illustrated), at least one gas diffusion layer 102, and a seal 104 that extends in a longitudinal direction 106 of the seal 104, around the gas diffusion layer 102.

As can best be seen from the cross section of FIG. 2, the seal 104 includes a linking region 108, a distribution region 110 that is remote from the gas diffusion layer 102, and a connection region 112 that connects the linking region 108 and the distribution region 110 to one another.

The seal 104 is preferably made in one piece.

The seal 104 is preferably injection molded.

The seal 104 is preferably made from an elastomer material.

The elastomer material preferably penetrates into the associated gas diffusion layer 102, with the result that the seal 104 is connected to the gas diffusion layer 102 by a substance-to-substance bond and/or by positive engagement.

The outer edge region of the gas diffusion layer 102 into which the material of the seal 104 penetrates, and which thus forms a constituent part of the linking region 108, is marked by cross hatching in FIG. 2 and is designated a penetration region 114.

The linking region 108 extends in a longitudinal direction 116, preferably in a closed ring, around the gas diffusion layer 102.

The longitudinal direction 116 of the linking region 108 runs parallel to the longitudinal direction 106 of the seal 104 as a whole.

The maximum height $H_A$ of the linking region 108 preferably corresponds at least to the height $H_G$ of the gas diffusion layer 102.

In this description and the attached claims, the term "height" of an element is used to mean the extent of the respective element in a stack direction 118 of the electrochemical device, in which a plurality of electrochemically active units 100 are arranged one above the other in the direction of the stack.

Together with a respective bipolar plate (not illustrated), an electrochemically active unit 100 may form an electrochemical cell of the electrochemical device.

In that case, the electrochemical device includes a plurality of electrochemical cells, which are arranged one above the other in the stack direction 118, and preferably two end plates between which the stack of electrochemical cells is arranged and which are clamped towards one another by a clamping device (not illustrated) in order to act upon the electrochemical cells that are arranged in between, and in particular the electrochemically active units 100 thereof, with a clamping force applied in the stack direction 118.

In a transverse direction 120 that is oriented perpendicular to the longitudinal direction 106 of the seal 104 and perpendicular to the stack direction 118, the linking region 108 is succeeded towards the outside by the connection region 112 of the seal 104.

The connection region 112 preferably takes the form of a flexible film and has a minimum height $h_C$ that is less than a quarter of the maximum height $H_A$ of the linking region 108.

The connection region 112 preferably takes a form that is substantially elastically deformable.

The connection region 112 extends in a longitudinal direction 122 of the connection region 112, in the peripheral direction around the linking region 108, and preferably takes the form of a closed ring.

The longitudinal direction 122 of the connection region 112 runs parallel to the longitudinal direction 106 of the seal 104 as a whole.

Adjoining the connection region 112 in the transverse direction 120 towards the outside is the distribution region 110, which has one or more sealing lips 124.

In the rest condition of the seal 104, that is to say in a relaxed condition in which the sealing lips 124 are not acted upon by a sealing force, the sealing lips 124 have a height $H_V$ which corresponds to the maximum height of the distribution region 110.

If there are a plurality of sealing lips 124, the heights of these sealing lips 124 could also differ from one another in the relaxed condition, in which case the maximum height $H_V$ of these sealing lips 124 forms the maximum height $H_V$ of the distribution region 110.

The sealing lips 124 extend in a longitudinal direction 126 of the distribution region 110, in the peripheral direction around the connection region 112 and the linking region 108, and preferably take the form of a closed ring.

The longitudinal direction 126 of the distribution region 110 runs parallel to the longitudinal direction 106 of the seal 104 as a whole.

If there are a plurality of sealing lips 124 in the distribution region 110, they are separated from one another by a respective lower intermediate region 128 that has a minimum height $h_Z$.

In order to limit the maximum deformation of the sealing lips 124, the distribution region 110 may further include a deformation limiter 130.

The deformation limiter 130 is preferably arranged outside the sealing lips 124 (which are in particular in a closed ring) and has a height $H_S$.

The deformation limiter 130 preferably has a flattened top with a substantially planar stop surface 132.

The deformation limiter 130 may extend in the longitudinal direction 126 of the distribution region 110, in the peripheral direction around the sealing lips 124, and preferably takes the form of a closed ring.

The deformation limiter 130 is preferably separated from the single sealing lip 124 or from the sealing lip 124 furthest towards the outside by an intermediate region 134 that has a lower height than the sealing lip 124 and the deformation limiter 130.

The intermediate region 134 has a minimum height $h'_Z$, which may be the same size as the minimum height $h_Z$ of the intermediate region 128 between two sealing lips 124.

However, the minimum height $h'_Z$ of the intermediate region 134 may also be greater or smaller than the minimum height $h_Z$ of the intermediate region 128.

The minimum height $h_C$ of the connection region 112 is less than a quarter of the maximum height $H_V$ of the distribution region 110, with the result that the connection region 112 forms a constriction point between the distribution region 110 and the linking region 108 of the seal 104.

Manufacture of the above-described seal 104 on the gas diffusion layer 102 is performed by an injection molding method, for example as follows:

A first injection mold part (not illustrated) is placed by means of a compression edge on the gas diffusion layer 102, for example on the delimiting surface 136 of the gas diffusion layer 102 that is illustrated at the top in FIG. 2, and a second injection mold part (not illustrated) is brought into abutment against the respectively opposing delimiting surface 138 of the gas diffusion layer 102, illustrated at the bottom in FIG. 2, in order to serve as an arrester for compression of the gas diffusion layer 102 in the region of the compression edge of the first injection mold part, with the result that a cavity to be filled with the preferably elastomeric injection molding material or sealing material is formed between the two injection mold parts.

The injection points for dispensing the injection molding material into the cavity are preferably arranged outside the deformation limiter 130, on plates provided separately for this purpose.

When the cavity is subsequently filled with the injection molding material that is to be cured and from which the seal 104 is formed, the injection molding material first penetrates into the distribution region 110 at the outer edge of the seal 104, this distribution region 110 having a large cross section for throughflow—taken perpendicular to the longitudinal direction 126—that is for example from 1 mm$^2$ to approximately 20 mm$^2$.

The heights $h_Z$, $h'_Z$, $H_S$ and $H_V$ of the different regions of the distribution region 110 are preferably in the range from approximately 0.5 mm to 2 mm.

By contrast, the height $h_C$ of the connection region 112 is substantially smaller, and is preferably less than 0.3 mm, in particular less than 0.1 mm, particularly preferably less than 0.05 mm.

The height $h_C$ of the connection region 112 may vary in the longitudinal direction 122 of the connection region 112, and thus over the periphery of the gas diffusion layer 102.

Because of its small height, the connection region 112 has a significantly greater flow resistance to the injected injection molding material than the distribution region 110, and for this reason the injected injection molding material is first distributed in the distribution region 110 and only then penetrates through the connection region 112 and into the linking region 108.

From the cavity, the injection molding material also penetrates into the edge region of the porous gas diffusion layer 102 that faces the cavity, with the result that the penetration region 114 of the gas diffusion layer 102 is penetrated by the material of the seal 104, and thus the linking region 108 of the seal 104 is connected to the gas diffusion layer 102 by a substance-to-substance bond and/or by positive engagement.

In so doing, the seal 104 substantially entirely surrounds the outer surface 140 of the gas diffusion layer 102.

After the injection molding material has cured to form the elastomeric sealing material and the injection mold parts have been removed, the arrangement of the seal 104 and the gas diffusion layer 102 takes the form shown in FIG. 2.

The gas diffusion layer 102, with the seal 104 integrally formed thereon, can now be joined to a membrane electrode assembly and preferably to a further gas diffusion layer, which may likewise have a seal integrally formed thereon, to give the electrochemically active unit 100.

The electrochemical device may in that case be composed of the electrochemically active units 100, which are arranged succeeding one another in the stack direction 118, bipolar plates arranged between them, and end plates arranged at the ends.

Figure 3:
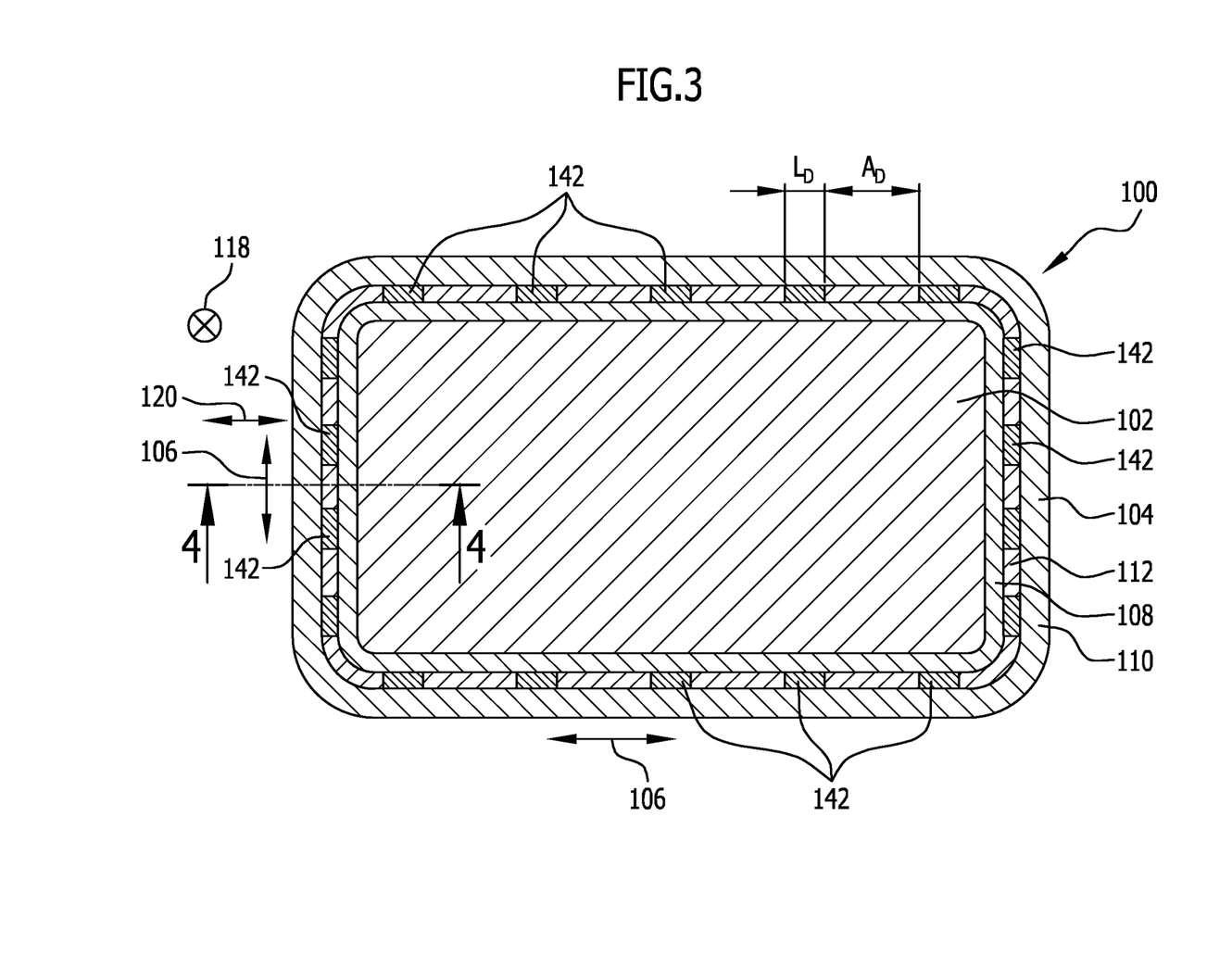
FIG. 3 shows a plan view, corresponding to FIG. 1, of a second embodiment of an electrochemically active unit for an electrochemical device, in which the connection region of the seal has thickened portions that are spaced from one another in a longitudinal direction of the connection region.
Figure 4:
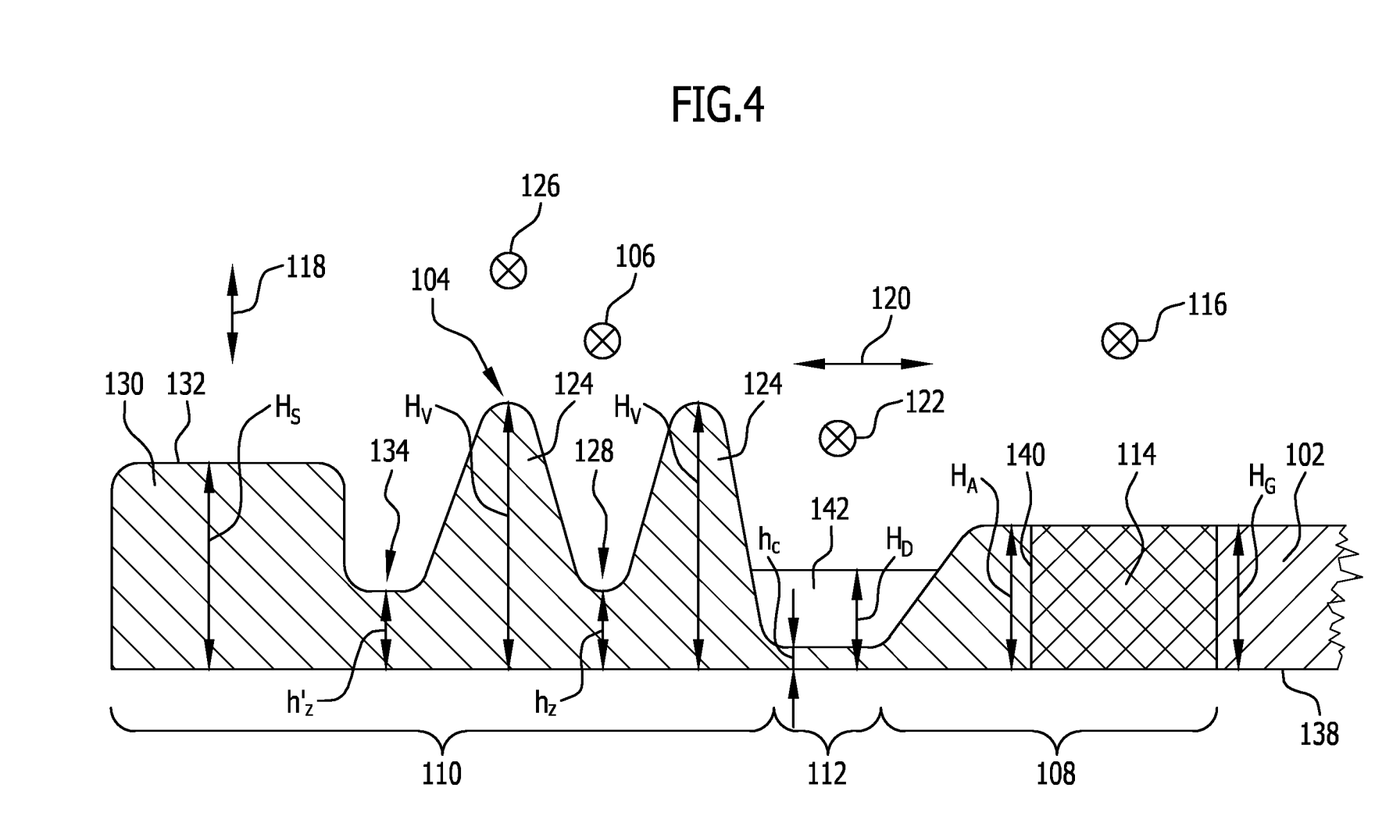
FIG. 4 shows a cross section of a detail, corresponding to FIG. 2, through the seal and the at least one gas diffusion layer of the electrochemically active unit from FIG. 3, along the line 4-4 in FIG. 3, wherein it can be seen from the cross section that the seal includes: a linking region; a distribution region; and a connection region that connects the linking region and the distribution region to one another, wherein the connection region has thickened portions that are spaced from one another in a longitudinal direction of the connection region.

A second embodiment of an electrochemically active unit 100, illustrated in FIGS. 3 and 4, differs from the first embodiment illustrated in FIGS. 1 and 2 in that the connection region 112 of the seal 104 has a plurality of thickened portions 142 that have a height $H_D$ exceeding the height $h_C$ of the sections of the connection region 112 in between.

For example, it may be provided for the height $H_D$ to be at least three times the height $h_C$.

In particular, it may be provided for the height $H_D$ to be at least approximately 0.15 mm, preferably at least approximately 0.3 mm, particularly preferably at least approximately 0.90 mm.

The thickened portions 142 are spaced from one another in the longitudinal direction 122 of the connection region 112.

In particular, the spacing $A_D$ between two thickened portions 142 that succeed one another in the longitudinal direction 122 of the connection region 112 may be at least approximately 5 mm, in particular at least approximately 10 mm.

The extent $L_D$ of a respective thickened portion 142 in the longitudinal direction 122 of the connection region 112 is preferably less than the spacing $A_D$ between two successive thickened portions 142 in the longitudinal direction 122 of the connection region 112.

The thicker thickened portions 142 have the result of mechanical stabilizing the connection region 112, in particular when the seal 104 is demolded from the injection mold parts.

Otherwise, the second embodiment of the electrochemically active unit 100 that is illustrated in FIGS. 3 and 4 corresponds, as regards its structure, functioning and mode of manufacture, to the first embodiment illustrated in FIGS. 1 and 2, so in this respect reference is made to the description thereof above.

The invention claimed is:

1. An electrochemically active unit for an electrochemical device, including
   a membrane electrode assembly,
   at least one gas diffusion layer and
   a seal extending in a longitudinal direction and a transverse direction and that is linked to at least one of the at least one gas diffusion layers,
   wherein the seal includes a linking region, a distribution region and a connection region that connects the linking region and the distribution region to one another,
   wherein the connection region has a minimum height in a lateral direction that is perpendicular to the longitudinal and transverse directions and that is less than a quarter of the maximum height of the distribution region and less than a quarter of the maximum height of the linking region,
   wherein the connection region has a varying cross-section around a perimeter of the at least one gas diffusion layer,
   wherein the connection region has thickened portions in which the connection region has a height that is greater than the minimum height of the connection region, and which are spaced from one another in the longitudinal direction of the connection region,
   wherein the connection region extends around the linking region in the longitudinal direction, and
   wherein the linking region is succeeded towards the outside of the seal by the connection region in the transverse direction of the seal that is oriented perpendicular to the longitudinal and lateral directions.

2. The electrochemically active unit according to claim 1, wherein the minimum height of the connection region is less than 0.3 mm.

3. The electrochemically active unit according to claim 1, wherein the connection region takes the form, at least in certain regions, of a flexible film.

4. The electrochemically active unit according to claim 1, wherein at least one of the thickened portions extends over the entire width of the connection region in a transverse direction of the connection region, perpendicular to the longitudinal direction of the connection region.

5. The electrochemically active unit according to claim 1, wherein the height of the thickened portions, the extent of each of the thickened portions in the longitudinal direction of the connection region, and/or the spacing between each pair of thickened portions succeeding one another in the longitudinal direction of the connection region varies in the longitudinal direction of the connection region.

6. The electrochemically active unit according to claim 1, wherein the seal has at least one sealing lip that forms a constituent part of the distribution region or a constituent part of the linking region.

7. The electrochemically active unit according to claim 1, wherein the seal has at least one deformation limiter that forms a constituent part of the distribution region or a constituent part of the linking region.

8. The electrochemically active unit according to claim 1, wherein the maximum height of the distribution region is at least 1.2 mm.

9. The electrochemically active unit according to claim 1, wherein the cross section of the distribution region varies in a longitudinal direction of the distribution region.

10. The electrochemically active unit according to claim 1, wherein the seal is injection molded and wherein the material of the seal penetrates part of at least one gas diffusion layer of the electrochemically active unit.

* * * * *

UNITED STATES PATENT AND TRADEMARK OFFICE
CERTIFICATE OF CORRECTION

| | |
|---|---|
| PATENT NO. | : 11,557,771 B2 |
| APPLICATION NO. | : 16/750569 |
| DATED | : January 17, 2023 |
| INVENTOR(S) | : Stahl et al. |

It is certified that error appears in the above-identified patent and that said Letters Patent is hereby corrected as shown below:

On the Title Page

Please insert, Item (30):
--Foreign Application Priority Data
July 28, 2017 (DE) . . . . . . . . . . . 10 2017 117 146.0--

Signed and Sealed this
Thirtieth Day of May, 2023

Katherine Kelly Vidal
*Director of the United States Patent and Trademark Office*